United States Patent
Monteil et al.

(10) Patent No.: US 10,308,770 B2
(45) Date of Patent: Jun. 4, 2019

(54) SILICONE COMPOSITION CROSSLINKING CATALYSTS

(71) Applicants: Bluestar Silicones France SAS, Lyons (FR); Universite Claude Bernard Lyon 1, Villeurbanne (FR); Centre National De La Recherche Scientifique, Paris (FR)

(72) Inventors: Vincent Monteil, Lyons (FR); Jean Raynaud, Villeurbanne (FR); Delphine Crozet, Villeurbanne (FR); Magali Bousquié, Lyons (FR); Sébastien Marrot, Lyons (FR)

(73) Assignees: ELKEN SILICONES FRANCE SAS, Lyons (FR); UNIVERSITE CLAUDE BERNARD LYON 1, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/523,494

(22) PCT Filed: Nov. 6, 2015

(86) PCT No.: PCT/FR2015/053017
§ 371 (c)(1),
(2) Date: May 1, 2017

(87) PCT Pub. No.: WO2016/071654
PCT Pub. Date: May 12, 2016

(65) Prior Publication Data
US 2018/0273690 A1 Sep. 27, 2018

(30) Foreign Application Priority Data
Nov. 7, 2014 (FR) ...................... 14 60803

(51) Int. Cl.
| | |
|---|---|
| *C08G 77/32* | (2006.01) |
| *C08G 77/08* | (2006.01) |
| *C08G 77/12* | (2006.01) |
| *C08G 77/20* | (2006.01) |
| *C08L 83/04* | (2006.01) |
| *C08G 77/44* | (2006.01) |
| *C08K 5/00* | (2006.01) |
| *C08L 83/00* | (2006.01) |
| *C08J 3/24* | (2006.01) |
| *C08K 3/22* | (2006.01) |
| *C08G 77/00* | (2006.01) |

(52) U.S. Cl.
CPC ............. *C08G 77/32* (2013.01); *C08G 77/08* (2013.01); *C08G 77/12* (2013.01); *C08G 77/20* (2013.01); *C08G 77/44* (2013.01); *C08J 3/24* (2013.01); *C08K 3/22* (2013.01); *C08K 5/0091* (2013.01); *C08L 83/00* (2013.01); *C08L 83/04* (2013.01); *C08G 77/70* (2013.01); *C08J 2383/05* (2013.01); *C08J 2383/07* (2013.01); *C08J 2483/05* (2013.01); *C08J 2483/07* (2013.01); *C08L 2205/025* (2013.01)

(58) Field of Classification Search
CPC ............................... C08G 77/12; C08G 77/20
See application file for complete search history.

(56) References Cited

U.S. PATENT DOCUMENTS

2002/0142174 A1* 10/2002 Kropp .................. C08K 5/0091
428/447

FOREIGN PATENT DOCUMENTS

| EP | 0604104 A2 | 6/1994 |
|---|---|---|
| FR | 2207924 A1 | 6/1974 |
| GB | 1391868 A | 4/1975 |
| WO | 2013052838 A1 | 4/2013 |

OTHER PUBLICATIONS

Marciniec, et al., "Catalysis of hydrosilylation Part XXV. Effect of nickel (O) and nickel (II) complex catalysts on dehydrogenative silylation, hydrosilylation and dimerization of vinyltriethoxysilane," J. Organometallic Chem., (1994) vol. 484: 147-151.
Marciniec, et al., "Catalysis of hydrosilylation XX *. Unusual reaction of vinyltriethoxysilane with triethoxysilane catalyzed by nickel acetylacetonate," J. Organometallic Chem., (1991) vol. 418: 61-67.

* cited by examiner

Primary Examiner — Kuo Liang Peng
(74) Attorney, Agent, or Firm — McBee Moore Woodward & Vanik IP, LLC

(57) ABSTRACT

The invention relates to a crosslinkable composition X, comprising: at least one organopolysiloxane compound A comprising, per molecule, at least two C2-C6 alkenyl radicals bonded to silicon atoms; at least one organohydrogenopolysiloxane compound B comprising, per molecule, at least two hydrogen atoms bonded to an identical or different silicon atom; at least one catalyst C which is a complex corresponding to the following formula: [Fe(L1)2] in which: the symbol Fe represents iron at degree of oxidation II; the symbols L1, which may be identical or different, represent a ligand which is a β-dicarbonylato anion or the enolate anion of a β-dicarbonylated compound; optionally at least one adhesion promoter D; and optionally at least one charge E. The invention also relates to the use of the previously described catalyst C as silicone composition crosslinking catalyst, to a silicone composition crosslinking method, wherein it comprises heating the composition X to a temperature of between 70 and 200° C., and to the resulting crosslinked silicone material Y.

17 Claims, No Drawings

SILICONE COMPOSITION CROSSLINKING CATALYSTS

CROSS-REFERENCE TO RELATED APPLICATIONS

This application is a National Stage entry of International Application No. PCT/FR2015/053017, filed Nov. 6, 2015, which claims priority to French Patent Application No. 1460803, filed Nov. 7, 2014.

BACKGROUND

Field of the Invention

The present invention relates to the field of crosslinking of silicone compositions, in which reagents bearing at least two unsaturated bonds and organosilicon compounds bearing at least two hydrogenosilyl units (—SiH) are placed in contact in the presence of a catalyst C which is a complex corresponding to the following formula:

[Fe(L$^1$)$_2$]

in which:
the symbol Fe represents iron in oxidation state II,
the symbols L$^1$, which may be identical or different, represent a ligand which is a β-dicarbonylato anion or the enolate anion of a β-dicarbonyl compound.

Technical Background

In the field of crosslinking of silicone compositions, hydrosilylation, also known as polyaddition, is a predominant reaction.

During a hydrosilylation reaction, a compound comprising at least one unsaturation reacts with a compound comprising at least one hydrogen atom bonded to a silicon atom. This reaction may be described, for example, by the reaction equation (1) in the case of an unsaturation of alkene type:

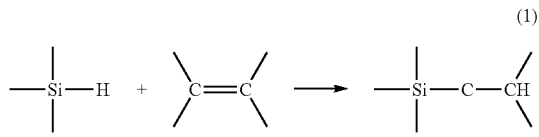
(1)

or by the reaction equation (2) in the case of an unsaturation of alkyne type:

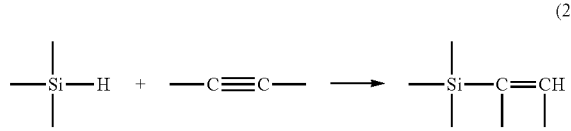
(2)

The hydrosilylation of unsaturated compounds is performed by catalysis, using an organometallic catalyst. Currently, the organometallic catalyst that is suitable for this reaction is a platinum catalyst. Thus, the majority of the industrial hydrosilylation reactions are catalyzed by the platinum Karstedt complex, of general formula Pt$_2$(divinyltetramethyldisiloxane)$_3$ (abbreviated as Pt$_2$(DVTMS)$_3$):

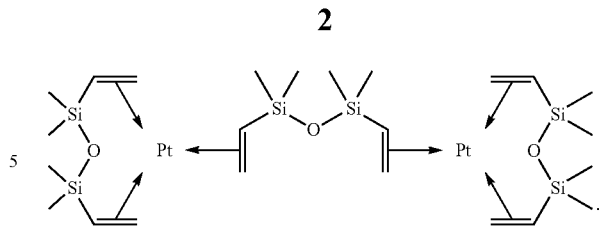

At the start of the 2000s, the preparation of platinum-carbene complexes of general formula:

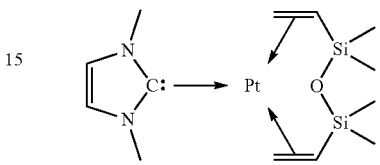

afforded access to more stable catalysts (see, for example, international patent application WO 01/42258).

However, the use of platinum organometallic catalysts is still problematic. It is a toxic, expensive metal that is becoming harder to find, and the price of which fluctuates enormously. It is therefore difficult to use at the industrial scale. It is thus desired to minimize the amount of catalyst required for the reaction, without, however, reducing the yield or the reaction rate. Moreover, it is desired to have available a catalyst that is stable over the course of the reaction. It has been found that, during the catalyzed reaction, platinum metal can precipitate, leading to the formation of insoluble colloids in the reaction medium. The catalyst is then less active. Furthermore, these colloids form cloudiness in the reaction medium, and the products obtained are not esthetically satisfying because they are colored.

Finally, platinum-based complexes catalyze hydrosilylation reactions at room temperature with rapid kinetics, of the order of a few minutes. In order to have the time to prepare, transport and use the composition before it has cured, it is often necessary to temporarily inhibit the hydrosilylation reaction. For example, when it is desired to coat a paper or polymer substrate with a nonstick silicone coat, the silicone composition is formulated to form a bath which must remain liquid at room temperature for several hours before being deposited on the substrate. It is only after this deposition that it is desired for the curing by hydrosilylation to take place. The introduction of hydrosilylation-inhibiting additives makes it possible to efficiently prevent the reaction for as long as necessary before activation. However, it is occasionally necessary to use large amounts of inhibitor, which causes strong inhibition of the hydrosilylation catalyst. As a consequence, the rate of curing of the composition, even after activation, is slowed down, which is a major drawback from an industrial viewpoint since this especially makes it necessary to reduce the coating rate and thus the production rate.

It would therefore be advantageous to propose alternative organometallic catalysts to the platinum-based catalysts and to have available novel compositions that are crosslinkable and/or curable by means of catalysts that no longer have the problems described above, in particular that do not require the use of an inhibitor.

This objective is achieved with the aid of a catalyst which is an iron (II) complex having a specific structure. These catalysts, in particular, do not need to be handled under a protective atmosphere (for example under argon). The crosslinking reactions in which they are used may also be performed in the open air, without a protective atmosphere.

According to a first aspect, a subject of the present invention is thus a crosslinkable composition X comprising:
- at least one organopolysiloxane compound A comprising, per molecule, at least two $C_2$-$C_6$ alkenyl radicals bonded to silicon atoms,
- at least one organohydrogenopolysiloxane compound B comprising, per molecule, at least two hydrogen atoms bonded to an identical or different silicon atom,
- at least one catalyst C which is a complex corresponding to the following formula:

$$[Fe(L^1)_2]$$

in which:
- the symbol Fe represents iron in oxidation state II,
- the symbols $L^1$, which may be identical or different, represent a ligand which is a β-dicarbonylato anion or the enolate anion of a β-dicarbonyl compound,
- optionally at least one adhesion promoter D and
- optionally at least one filler E.

Composition X according to the invention is crosslinkable, i.e., for the purposes of the present patent application, once the compounds A and B have reacted together in the presence of the catalyst C, a three-dimensional network forms, which leads to curing of the composition. Crosslinking thus involves a gradual physical change in the medium constituting the composition.

According to a second aspect, a subject of the invention is also the use of the catalyst C described previously as a catalyst for crosslinking silicone compositions.

According to a third aspect, a subject of the invention is also a process for crosslinking silicone compositions, characterized in that it consists in heating composition X described previously to a temperature ranging from 70 to 200° C., preferably from 80 to 150° C. and more preferentially from 80 to 130° C., and also the crosslinked silicone material Y thus obtained.

Finally, according to a fourth aspect, a subject of the invention is a crosslinked silicone material Y obtained by heating to a temperature ranging from 70 to 200° C., preferably from 80 to 150° C. and more preferentially from 80 to 130° C., of a crosslinkable composition X as described previously.

The term "crosslinked silicone material" means any silicone-based product obtained by crosslinking and/or curing of compositions comprising organopolysiloxanes bearing at least two unsaturated bonds and organopolysiloxanes bearing at least two hydrogenosilyl units (—SiH). The crosslinked silicone material may be, for example, an elastomer, a gel or a foam.

According to a particularly advantageous mode, the organopolysiloxane A comprising, per molecule, at least two $C_2$-$C_6$ alkenyl radicals bonded to silicon atoms, comprises:
(i) at least two siloxyl units (A.1), which may be identical or different, having the following formula:

$$W_a Z_b SiO_{\frac{4-(a+b)}{2}} \quad (A.1)$$

in which:
- a=1 or 2, b=0, 1 or 2 and a+b=1, 2 or 3;
- the symbols W, which may be identical or different, represent a linear or branched $C_2$-$C_6$ alkenyl group,
- and the symbols Z, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, (ii) and optionally at least one siloxyl unit having the following formula:

$$Z^1_a SiO_{\frac{4-a}{2}} \quad (A.2)$$

in which:
- a=0, 1, 2 or 3,
- the symbols $Z^1$, which may be identical or different, represent a monovalent hydrocarbon-based group containing from 1 to 30 carbon atoms, preferably chosen from the group formed by alkyl groups containing from 1 to 8 carbon atoms inclusive and aryl groups containing between 6 and 12 carbon atoms, and even more preferentially chosen from the group formed by methyl, ethyl, propyl, 3,3,3-trifluoropropyl, xylyl, tolyl and phenyl radicals.

Advantageously, the radicals Z and $Z^1$ are chosen from the group formed by methyl and phenyl radicals, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

These organopolysiloxanes may have a linear, branched or cyclic structure. Their degree of polymerization is preferably between 2 and 5000.

When they are linear polymers, they are essentially formed from siloxyl units "D" chosen from the group formed by the siloxyl units $W_2SiO_{2/2}$, $WZSiO_{2/2}$ and $Z^1_2SiO_{2/2}$, and from siloxyl units "M" chosen from the group formed by the siloxyl units $W_3SiO_{1/2}$, $WZ_2SiO_{1/2}$, $W_2ZSiO_{1/2}$ and $Z^1_3SiO_{1/2}$. The symbols W, Z and $Z^1$ are as described above.

As examples of end units "M", mention may be made of trimethylsiloxy, dimethylphenylsiloxy, dimethylvinylsiloxy or dimethylhexenylsiloxy groups.

As examples of units "D", mention may be made of dimethylsiloxy, methylphenylsiloxyc, methylvinylsiloxy, methylbutenylsiloxy, methylhexenylsiloxy, methyldecenylsiloxy or methyldecadienylsiloxy groups.

Said organopolysiloxanes A may be oils with a dynamic viscosity from about 10 to 100 000 mPa·s at 25° C., generally from about 10 to 70 000 mPa·s at 25° C., or gums with a molecular mass of about 1 000 000 mPa·s or more at 25° C.

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

When they are cyclic organopolysiloxanes, they are formed from siloxyl units "D" having the following formulae: $W_2SiO_{2/2}$, $Z_2SiO_{2/2}$ or $WZSiO_{2/2}$, which may be of the dialkylsiloxy, alkylarylsiloxy, alkylvinylsiloxy or alkylsiloxy type. Examples of such siloxyl units have already been mentioned above. Said cyclic organopolysiloxanes A have a viscosity from about 10 to 5000 mPa·s at 25° C.

According to a preferred embodiment, composition X according to the invention comprises a second organopolysiloxane compound comprising, per molecule, at least two $C_2$-$C_6$ alkenyl radicals bonded to silicon atoms, different from the organopolysiloxane compound A, said second organopolysiloxane compound preferably being divinyltetramethyl siloxane (dvtms).

Preferably, the organopolysiloxane compound A has a mass content of Si-vinyl units of between 0.001 and 30%, preferably between 0.01 and 10%.

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:

(i) at least two siloxyl units and preferably at least three siloxyl units having the following formula:

  (B.1)

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals, and (ii) optionally at least one siloxyl unit having the following formula:

  (B.2)

in which:
c=0, 1, 2 or 3,
the symbols $Z^2$, which may be identical or different, represent a monovalent hydrocarbon-based group containing from 1 to 30 carbon atoms, preferably chosen from the group formed by alkyl groups containing from 1 to 8 carbon atoms and aryl groups containing between 6 and 12 carbon atoms, and even more preferentially chosen from the group formed by methyl, ethyl, propyl, 3,3,3-trifluoropropyl, xylyl, tolyl and phenyl radicals.

The organohydrogenopolysiloxane compound B may be formed solely from siloxyl units of formula (B.1) or may also comprise units of formula (B.2). It may have a linear, branched or cyclic structure. The degree of polymerization is preferably greater than or equal to 2. More generally, it is less than 5000.

Examples of siloxyl units of formula (B.1) are especially the following units: $H(CH_3)_2SiO_{1/2}$, $HCH_3SiO_{2/2}$ and $H(C_6H_5)SiO_{2/2}$.

When they are linear polymers, they are essentially formed from:
siloxyl units "D" chosen from the units having the following formulae $Z^2_2SiO_{2/2}$ or $Z^3HSiO_{2/2}$, and
siloxyl units "M" chosen from the units having the following formulae $Z^3_3SiO_{1/2}$ or $Z^3_2HSiO_{1/2}$.

These linear organopolysiloxanes may be oils with a dynamic viscosity from about 1 to 100 000 mPa·s at 25° C., generally from about 10 to 5000 mPa·s at 25° C., or gums with a molecular mass of about 1 000 000 mPa·s or more at 25° C.

When they are cyclic organopolysiloxanes, they are formed from siloxyl units "D" having the following formulae $Z^2_2SiO_{2/2}$ and $Z^3HSiO_{2/2}$, which may be of the dialkylsiloxy or alkylarylsiloxy type or units $Z^3HSiO_{2/2}$ solely. They then have a viscosity from about 1 to 5000 mPa·s.

Examples of linear organohydrogenopolysiloxane compounds B are: dimethylpolysiloxanes bearing hydrogenodimethylsilyl end groups, dimethylhydrogenomethylpolysiloxanes bearing trimethylsilyl end groups, dimethylhydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

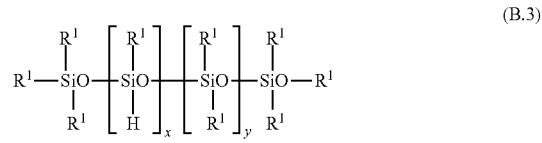  (B.3)

in which:
x and y are an integer ranging between 0 and 200,
the symbols $R^1$, which may be identical or different, represent, independently of each other:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
a cycloalkyl radical containing between 5 and 8 cyclic carbon atoms,
an aryl radical containing between 6 and 12 carbon atoms, or
an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

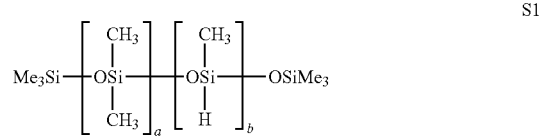  S1

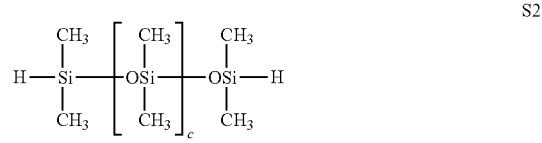  S2

-continued

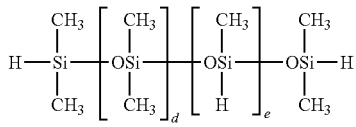

with a, b, c, d and e defined below:
in the polymer of formula S1:
0≤a≤150, preferably 0≤a≤100, and more particularly 0≤a≤20, and
1≤b≤90, preferably 10≤b≤80 and more particularly 30≤b≤70,
in the polymer of formula S2: 0≤c≤15
in the polymer of formula S3: 5≤d≤200, preferably 20≤d≤100, and 2≤e≤90, preferably 10≤e≤70.

In particular, the organohydrogenopolysiloxane compound B that is suitable for use in the invention is the compound of formula S1, in which a=0.

Preferably, the organohydrogenopolysiloxane compound B has a mass content of SiH units of between 0.2 and 91%, preferably between 0.2 and 50%.

In the context of the invention, the proportions of the organopolysiloxane A and of the organohydrogenopolysiloxane B are such that the mole ratio of the hydrogen atoms bonded to silicon (Si—H) in the organohydrogenopolysiloxane B to the alkenyl radicals bonded to silicon (Si—CH═CH$_2$) in the organopolysiloxane A is between 0.2 and 20, preferably between 0.5 and 15, more preferentially between 0.5 and 10 and even more preferentially between 0.5 and 5.

According to a preferred embodiment, the organopolysiloxane A and/or the organohydrogenopolysiloxane B may be degassed under an inert atmosphere of nitrogen (N$_2$) or argon (Ar) to promote the crosslinking.

The composition according to the invention uses at least one catalyst C which is a complex corresponding to the following formula:

$$[Fe(L^1)_2]$$

in which:
the symbol Fe represents iron in oxidation state II,
the symbols $L^1$, which may be identical or different, represent a ligand which is a β-dicarbonylato anion or the enolate anion of a β-dicarbonyl compound.

It should be noted that at least part of the inventive nature of the invention is due to the judicious and advantageous selection of the structure of the catalyst C.

According to another preferred embodiment of the invention, the ligand $L^1$ is an anion derived from a compound of formula (1): $R^1COCHR^2COR^3$ (1)
in which:
$R^1$ and $R^3$, which may be identical or different, represent a linear, cyclic or branched $C_1$-$C_{30}$ hydrocarbon-based radical, an aryl containing between 6 and 12 carbon atoms or a radical —$OR^4$ with $R^4$ representing a linear, cyclic or branched $C_1$-$C_{30}$ hydrocarbon-based radical,
$R^2$ is a hydrogen atom or a hydrocarbon-based radical, preferably an alkyl radical comprising from 1 to 4 carbon atoms; with
$R^1$ and $R^2$ may be joined together to form a $C_5$-$C_6$ ring, and
$R^2$ and $R^4$ may be joined together to form a $C_5$-$C_6$ ring.

Advantageously, the compound of formula (1) is chosen from the group formed by the β-diketones: 2,4-pentanedione (acac); 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (TMHD); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; benzoylstearoylmethane; benzoylpalmitoylmethane; octanoylbenzoylmethane; 4-t-butyl-4'-methoxydibenzoylmethane; 4,4'-dimethoxydibenzoylmethane and 4,4'-di-tert-butyldibenzoylmethane, and preferably from the β-diketones 2,4-pentanedione (acac) and 2,2,6,6-tetramethyl-3,5-heptanedione (TMHD).

According to another preferred embodiment of the invention, the β-dicarbonylato ligand $L^1$ is a β-keto esterate anion chosen from the group formed by anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid or those described in patent application FR-A-1435882.

According to a particularly preferred embodiment, the catalyst C is chosen from the complexes [Fe(acac)$_2$] and [Fe(TMHD)$_2$]. It is understood that, in the above formulae, "acac" means the anion derived from the compound 2,4-pentanedione and "TMHD" means the anion derived from the compound 2,2,6,6-tetramethyl-3,5-heptanedione.

The catalyst C may especially be present in composition X according to the invention in a content ranging from 0.001 to 10 mol % of iron per number of moles of $C_2$-$C_6$ alkenyl radicals bonded to silicon atoms in the organopolysiloxane compound A, preferably from 0.01 to 7%, and more preferentially from 0.1 to 5%.

Composition X according to the invention is preferably free of catalyst based on platinum, palladium, ruthenium or rhodium. The term "free" of catalyst other than the catalyst C means that composition X according to the invention comprises less than 0.1% by weight of catalyst other than the catalyst C, preferably less than 0.01% by weight, and more preferentially less than 0.001% by weight, relative to the total weight of the composition.

Composition X may advantageously comprise at least one adhesion promoter D.

Without this being limiting, it may be considered that the adhesion promoter D comprises:
(D.1) at least one alkoxylated organosilane containing, per molecule, at least one $C_2$-$C_6$ alkenyl group, or
(D.2) at least one organosilicon compound comprising at least one epoxy radical, or
(D.3) at least one metal chelate M and/or a metal alkoxide of general formula: M(OJ)n, with n=valency of M and J=linear or branched $C_1$-$C_8$ alkyl,
M being chosen from the group formed by: Ti, Zr, Ge, Li, Mn, Fe, Al and Mg or mixtures thereof.

In accordance with a preferred embodiment of the invention, the alkoxylated organosilane (D.1) of the adhesion promoter D is chosen from the products having the general formula below:

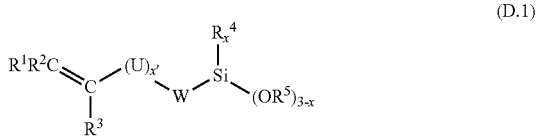

(D.1)

in which formula:
R1, R2 and R3 are hydrogenated radicals or identical or different hydrocarbon-based radicals and represent a hydrogen atom, a linear or branched $C_1$-$C_4$ alkyl or a phenyl optionally substituted with at least one $C_1$-$C_3$ alkyl, U is a linear or branched $C_1$-$C_4$ alkylene, W is a valency bond, $R^4$ and $R^5$ are identical or different radicals and represent a linear or branched $C_1$-$C_4$ alkyl, x'=0 or 1, and x=0 to 2.

Without this being limiting, it may be considered that vinyltrimethoxysilane is a particularly suitable compound (D.1).

As regards the organosilicon compound (D.2), it is envisaged in accordance with the invention to choose it:

a) either from the products (D.2a) corresponding to the following general formula:

(D.2a)

in which formula:
$R^6$ is a linear or branched $C_1$-$C_4$ alkyl radical,
$R^7$ is a linear or branched alkyl radical,
y is equal to 0, 1 or 3, and
X being defined by the following formula:

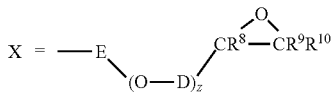

with:
E and D which are identical or different radicals chosen from linear or branched $C_1$-$C_4$ alkyls,
z is equal to 0 or 1,
$R^8$, $R^9$, $R^{10}$ which are identical or different radicals representing a hydrogen atom or a linear or branched $C_1$-$C_4$ alkyl, and
$R^8$ and $R^9$ or $R^{10}$ which may alternatively constitute, together with the two carbons bearing the epoxy, a 5- to 7-membered alkyl ring, or b) or from the products (D.2b) formed by epoxy-functional polydiorganosiloxanes comprising:
(i) at least one siloxyl unit having the formula:

(D.2 bi)

in which formula:
X is the radical as defined above for formula (D.2 a)
G is a monovalent hydrocarbon-based group, free of an unfavorable action on the activity of the catalyst, and chosen from alkyl groups containing from 1 to 8 carbon atoms inclusive, optionally substituted with at least one halogen atom, and also from aryl groups containing between 6 and 12 carbon atoms,
p=1 or 2,
q=0, 1 or 2,
p+q=1, 2 or 3, and
(ii) optionally at least one siloxyl unit having the formula:

(D.2 bii)

in which formula G has the same meaning as above and r is equal to 0, 1, 2 or 3.

As regards the last compound (D.3) of the adhesion promoter D, the preferred products are those in which the metal M of the chelate and/or of the alkoxide (D.3) is chosen from the following list: Ti, Zr, Ge, Li or Mn. It should be pointed out that titanium is more particularly preferred. It may be combined, for example, with an alkoxy radical of butoxy type.

The adhesion promoter D may be formed from:
(D.1) alone
(D.2) alone
(D.1)+(D.2)
Or according to two preferred modes of:
(D.1)+(D.3)
(D.2)+(D.3)
and finally, according to the most preferred mode: (D.1)+(D.2)+(D.3).

According to the invention, an advantageous combination for forming the adhesion promoter is the following:
vinyltrimethoxysilane (VTMO), 3-glycidoxypropyltrimethoxysilane (GLYMO) and butyl titanate.

In quantitative terms, it may be pointed out that the weight proportions between (D.1), (D.2) and (D.3), expressed as weight percentages relative to the total of the three, are as follows:
(D.1)≤10, preferably between 15 and 70 and even more preferentially between 25 and 65,
(D.2)≤90, preferably between 70 and 15 and even more preferentially between 65 and 25, and
(D.3)≤1, preferably between 5 and 25 and even more preferentially between 8 and 18,
it being understood that the sum of these proportions of (D.1), (D.2) and (D.3) is equal to 100%.

For better adhesion properties, the weight ratio (D.2):(D.1) is preferably between 2:1 and 0.5:1, the ratio 1:1 being more particularly preferred.

Advantageously, the adhesion promoter D is present in a proportion of from 0.1 to 10% by weight, preferably 0.5 to 5% by weight and more preferentially from 1 to 3% by weight, relative to the total weight of all of the constituents of the composition X.

According to a particular embodiment, the composition X according to the invention also comprises at least one filler E.

The fillers E optionally contained in the compositions according to the invention are preferably mineral. They may especially be siliceous. When they are siliceous materials, they may act as reinforcing or semi-reinforcing filler. The reinforcing siliceous fillers are chosen from colloidal silicas, powders of fumed silica and of precipitated silica, or a mixture thereof. These powders have a mean particle size generally less than 0.1 µm (micrometers) and a BET specific surface area of greater than 30 m²/g, preferably between 30 and 350 m²/g. Semi-reinforcing siliceous fillers such as diatomaceous earths or ground quartz may also be used. As regards the nonsiliceous mineral materials, they may be included as semi-reinforcing or bulking mineral filler. Examples of these nonsiliceous fillers that may be used, alone or as a mixture, are carbon black, titanium dioxide, aluminum oxide, hydrated alumina, expanded vermiculite, non-expanded vermiculite, calcium carbonate optionally surface-treated with fatty acids, zinc oxide, mica, talc, iron oxide, barium sulfate and slaked lime. These fillers have a particle size generally between 0.001 and 300 µm (micrometers) and a BET surface area of less than 100 m²/g. In practical but nonlimiting terms, the fillers used may be a mixture of quartz and silica. The fillers may be treated with any suitable product. In terms of weight, use is preferably made of an amount of filler of between 1% and 50% and preferably between 1% and 40% by weight relative to all the constituents of the composition.

The composition X according to the invention may also comprise one or more common functional additives. Families of common functional additives that may be mentioned include:
- silicone resins,
- adhesion modifiers,
- consistency-enhancing additives,
- pigments, and
- heat-resistance, oil-resistance or fire-resistance additives, for example metal oxides.

Silicone resins are branched organopolysiloxane oligomers or polymers that are well known and commercially available. They have, in their structure, at least two different units chosen from those of formula $R_3SiO_{1/2}$ (M unit), $R_2SiO_{2/2}$ (D unit), $RSiO_{3/2}$ (T unit) and $SiO_{4/2}$ (Q unit) with at least one of these units being a T or Q unit.

The radicals R are identical or different and are chosen from linear or branched C1-C6 alkyl, hydroxyl, phenyl or 3,3,3-trifluoropropyl radicals. Examples of alkyl radicals that may be mentioned include methyl, ethyl, isopropyl, tert-butyl and n-hexyl radicals.

Examples of branched organopolysiloxane oligomers or polymers that may be mentioned include MQ resins, MDQ resins, TD resins and MDT resins, it being possible for the hydroxyl functions to be borne by the M, D and/or T units. As examples of resins that are particularly suitable for use, mention may be made of hydroxylated MDQ resins with a weight content of hydroxyl groups of between 0.2 and 10% by weight.

The compositions X according to the invention may especially be obtained by first introducing the catalyst C into the reaction medium, followed by adding the organopolysiloxane A with stirring. Finally, the organohydrogenopolysiloxane compound B is introduced and the temperature of the mixture is increased to reach the crosslinking temperature. The mixture is maintained at the crosslinking temperature until the stirring stops due to an increase in the viscosity of the mixture.

A subject of the present invention is also a process for crosslinking silicone compositions, characterized in that it consists in heating composition X as defined previously to a temperature ranging from 70 to 200° C., preferably from 80 to 150° C. and more preferentially from 80 to 130° C.

A subject of the invention is also a crosslinked silicone material Y obtained by heating to a temperature ranging from 70 to 200° C., preferably from 80 to 150° C. and more preferentially from 80 to 130° C., of a crosslinkable composition X comprising:
- at least one organopolysiloxane compound A comprising, per molecule, at least two $C_2$-$C_6$ alkenyl radicals bonded to silicon atoms,
- at least one organohydrogenopolysiloxane compound B comprising, per molecule, at least two hydrogen atoms bonded to an identical or different silicon atom,
- at least one catalyst C which is a complex corresponding to the following formula:

$$[Fe(L^1)_2]$$

in which:
- the symbol Fe represents iron in oxidation state II,
- the symbols $L^1$, which may be identical or different, represent a ligand which is a β-dicarbonylato anion or the enolate anion of a β-dicarbonyl compound,
- optionally at least one adhesion promoter D and
- optionally at least one filler E.

The composition according to the invention has the advantage of not being air-sensitive and thus of being able to be used and especially crosslinked under a non-inert atmosphere, and in particular in air.

The present invention is illustrated in greater detail in the following nonlimiting implementation example.

EXAMPLE: IRON-BASED CATALYSTS FOR THE CROSSLINKING OF $M^{vi} D_{70} M^{vi}$ WITH $MD'_{50}M$

I) Constituents
1) Organopolysiloxane A of formula $M^{vi}D_{70}M^{vi}$ (0.038 mol of vinyl radicals bonded to silicon per 100 g of oil), with: Vi=Vinyl; $M^{vi}$: $(CH_3)_2ViSiO_{1/2}$ and D: $(CH_3)_2SiO_{2/2}$
2) Organohydrogenopolysiloxane B of formula: $MD'_{50}M$ (1.58 mol of hydrogen atoms bonded to silicon per 100 g of oil), with: M: $(CH_3)_3SiO_{1/2}$; and D': $(CH_3)HSiO_{2/2}$
3) Catalysts (A) and (B)

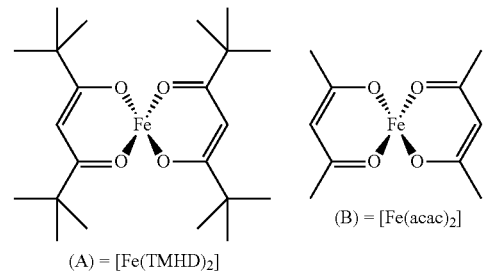

(A) = [Fe(TMHD)₂]     (B) = [Fe(acac)₂]

The catalysts (A) and (B) are obtained via a synthesis that is well known to those skilled in the art:

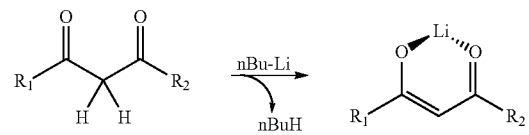

The acac or THMD compound (supplier: Strem) is, in a first stage, deprotonated using one equivalent of Bu-Li (supplier:

Sigma-Aldrich) at low temperature (−78° C.). The salt obtained is recrystallized from diethyl ether. The deprotonated ligand obtained (lithium salt) is added to an iron chloride ($FeCl_2$) dissolved in THF at room temperature (12 hours). After separation of the phases by settling, filtration and concentration, the complex is recrystallized from THF.

The complex [Fe(acac)$_2$] is in the form of an orangey brown solid.

The complex [Fe(THMD)$_2$] is in the form of an oily bright red solid.

II) Formulations and Results:

For each formulation tested, the catalyst is weighed and introduced at room temperature into a glass flask.

5 g of oil $M^{vi}D_{70}M^{vi}$ are then introduced, followed by 0.6 g of oil $MD'_{50}M$.

The flask is stirred in an oil bath which will be heated to the desired reaction temperature.

The ratio R corresponding to the mole ratio of hydrogen atoms bonded to silicon (Si—H) in the organohydrogenopolysiloxane ($MD'_{50}M$) to the alkenyl radicals (in this instance vinyl) bonded to silicon (Si—CH=CH$_2$) in the organopolysiloxane (dvtms) being 4:1.

The start of crosslinking is measured. The start of crosslinking is defined as being the stopping of stirring due to an increase in the viscosity of the medium.

TABLE 1

| Catalyst | | Reaction temperature | mol % of catalyst[1] | Ratio R | Atmosphere | Start of crosslinking |
|---|---|---|---|---|---|---|
| Formulation 1 (invention) | [Fe(acac)$_2$] | 200° C. | 2% | 4:1 | Not inert | Between 6 h and 20 h |
| Formulation 2 (invention) | [Fe(TMHD)$_2$] | 200° C. | 2% | 4:1 | Not inert | 24 h |

[1]Expressed as mol % of iron per number of moles of vinyl radicals bonded to silicon (Si—CH=CH$_2$) in dvtms The results show that the formulations 1 and 2 according to the invention, in which the catalyst is a Fe(II) complex bearing two-dicarbonyl ligands, crosslink between 6 h and 24 h.

The invention claimed is:

1. A crosslinkable composition X comprising:
   at least one organopolysiloxane compound A comprising, per molecule, at least two C2-C6 alkenyl radicals bonded to silicon atoms,
   at least one organohydrogenopolysiloxane compound B comprising, per molecule, at least two hydrogen atoms bonded to an identical or different silicon atom,
   at least one catalyst C which is a complex corresponding to the following formula:

[Fe(L$^1$)$_2$]

in which:
   the symbol Fe represents iron in oxidation state II,
   the symbols L$^1$, which may be identical or different, represent a ligand which is a β-dicarbonylato anion or the enolate anion of a β-dicarbonyl compound,
   optionally at least one adhesion promoter D and
   optionally at least one filler E,
   wherein said composition is free of any catalysts comprising rhodium.

2. The composition X as claimed in claim 1, wherein the catalyst C is present in a content ranging from 0.001 to 10 mol % of iron per number of moles of $C_2$-$C_6$ alkenyl radicals bonded to silicon atoms in the organopolysiloxane compound A.

3. The composition X claimed in claim 1, wherein said composition is free of catalyst based on any of platinum, palladium, ruthenium or rhodium.

4. The composition X as claimed in claim 1, wherein the ligand L$^1$ is an anion derived from a compound of formula (1):

$$R^1COCHR^2COR^3 \qquad (1)$$

in which:
R$^1$ and R$^3$, which may be identical or different, represent a linear, cyclic or branched $C_1$-$C_{30}$ hydrocarbon-based radical, an aryl containing between 6 and 12 carbon atoms or a radical OR$^4$ with R$^4$ representing a linear, cyclic or branched $C_1$-$C_{30}$ hydrocarbon-based radical, R$^2$ is a hydrogen atom or a hydrocarbon-based radical; wherein R$^1$ and R$^2$ may be joined together to form a $C_5$-$C_6$ ring, and R$^2$ and R$^4$ may be joined together to form a $C_5$-$C_6$ ring.

5. The composition X as claimed in claim 4, in which the compound of formula (1) is chosen from the group formed by the following β-diketones: 2,4-pentanedione (acac); 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (TMHD); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; benzoylstearoylmethane; benzoylpalmitoylmethane; octanoylbenzoylmethane; 4-t-butyl-4'-methoxydibenzoylmethane; 4,4'-dimethoxydibenzoylmethane and 4,4'-di-tert-butyldibenzoylmethane.

6. The composition X as claimed in claim 4, in which the compound of formula (1) is chosen from the group formed from the β-diketones 2,4-pentanedione (acac) or 2,2,6,6-tetramethyl-3,5-heptanedione (TMHD).

7. The composition X as claimed in claim 1, in which the catalyst C is chosen from the complexes [Fe(acac)$_2$] and [Fe(TMIHD)$_2$].

8. The composition X as claimed in claim 1, wherein the organopolysiloxane A comprises:

(i) at least two siloxyl units (A.1), which may be identical or different, having the following formula:

$$W_a Z_b SiO_{\frac{4-(a+b)}{2}} \qquad (A.1)$$

in which:
a=1 or 2, b=0, 1 or 2 and a+b=1, 2 or 3;
the symbols W, which may be identical or different, represent a linear or branched $C_2$-$C_6$ alkenyl group, and the symbols Z, which may be identical or different, represent a monovalent hydrocarbon-based group containing from 1 to 30 carbon atoms,
(ii) and optionally at least one siloxyl unit having the following formula:

$$Z'_a SiO_{\frac{4-a}{2}} \quad (A.2)$$

in which:
a=0, 1, 2 or 3,
the symbols Z', which may be identical or different, represent a monovalent hydrocarbon-based group containing from 1 to 30 carbon atoms.

9. The composition X as claimed in claim 1, in which the organohydrogenopolysiloxane compound B comprises at least three hydrogen atoms per molecule directly bonded to an identical or different silicon atom.

10. The composition X as claimed in claim 1, in which the organohydrogenopolysiloxane compound B is an organopolysiloxane comprising:
(i) at least two siloxyl units having the following formula:

$$H_d Z^3_e SiO_{\frac{4-(d+e)}{2}} \quad (B.1)$$

in which:
d=1 or 2, e=0, 1 or 2 and d+e=1, 2 or 3,
the symbols $Z^3$, which may be identical or different, represent a monovalent hydrocarbon-based group containing from 1 to 30 carbon atoms and
(ii) optionally at least one siloxyl unit having the following formula:

$$Z^2_c SiO_{\frac{4-c}{2}} \quad (B.2)$$

in which:
c=0, 1, 2 or 3,
the symbols $Z^2$, which may be identical or different, represent a monovalent hydrocarbon-based group containing from 1 to 30 carbon atoms.

11. The composition X as claimed in claim 1, wherein said composition comprises a second organopolysiloxane compound comprising, per molecule, at least two $C_2$-$C_6$ alkenyl radicals bonded to silicon atoms, different from the organopolysiloxane compound $A_I$.

12. The composition X as claimed in claim 1, wherein proportions of the organopolysiloxane A and of the organohydrogenopolysiloxane B are such that the mole ratio of hydrogen atoms bonded to silicon in the organohydrogenopolysiloxane B to the alkenyl radicals bonded to silicon in the organopolysiloxane A is between 0.2 and 20.

13. The composition X as claimed in claim 1, wherein said composition comprises one or more functional additives chosen from:
silicone resins,
adhesion modifiers,
consistency-enhancing additives,
pigments, and
heat-resistance, oil-resistance or fire-resistance additives, optionally metal oxides.

14. A process for crosslinking one or more silicone compositions, wherein said process comprises heating a composition X as claimed in claim 1 to a temperature ranging from 70 to 200° C.

15. A crosslinked silicone material Y obtained by heating to a temperature ranging from 70 to 200° C., a composition X as claimed in claim 1.

16. The composition X as claimed in claim 1, wherein said composition comprises a second organopolysiloxane compound which is a divinyltetramethyl disiloxane.

17. A silicone composition product crosslinked with a catalyst C, which is a complex corresponding to the following formula:

[Fe($L^1$)$_2$]

in which:
the symbol Fe represents iron in oxidation state II,
the symbols $L^1$, which may be identical or different, represent a ligand which is a β-dicarbonylato anion or the enolate anion of a β-dicarbonyl compound, wherein said composition is not crosslinked with any catalysts comprising rhodium.

* * * * *